United States Patent [19]

Morrison et al.

[11] Patent Number: 4,488,236

[45] Date of Patent: Dec. 11, 1984

[54] HELICOPTER CRUISE FUEL CONSERVING ENGINE CONTROL

[75] Inventors: Terry Morrison, Vernon; James J. Howlett, North Haven; Raymond D. Zagranski, Somers, all of Conn.

[73] Assignee: United Technologies Corporation, Hartford, Conn.

[21] Appl. No.: 369,302

[22] Filed: Apr. 16, 1982

[51] Int. Cl.³ .............................. F02C 9/08
[52] U.S. Cl. .................... 364/442; 364/431.01; 364/431.05; 244/182
[58] Field of Search ............ 364/431.01–431.05, 364/442, 510, 427, 428; 244/182, 180; 377/21; 73/113–114; 318/583–584

[56] References Cited

U.S. PATENT DOCUMENTS

| | | | |
|---|---|---|---|
| 3,863,054 | 1/1975 | Monpetit | 364/431.05 |
| 4,159,088 | 6/1979 | Cosley | 244/182 |
| 4,322,800 | 3/1982 | Hisegawa et al. | 364/442 |
| 4,325,123 | 4/1982 | Graham et al. | 244/182 |
| 4,344,141 | 8/1982 | Yates | 364/442 |

Primary Examiner—Gary Chin
Assistant Examiner—Thomas G. Black
Attorney, Agent, or Firm—M. P. Williams

[57] ABSTRACT

A digital fuel control (53) for a helicopter engine (20) controls fuel flow (52) to the engine in response to a turbine reference speed (62) determined in a normal mode (FIG. 5) to be a rated speed, in a fade-in mode (FIG. 6) to be incremented (117, 120) to an estimated optimum minimum speed (114, 115, 125), in an optimizer mode (FIG. 7) to be incremented (138) in a direction (137) leading to least fuel consumption (135), and in a fade-out mode (FIG. 8) to be incremented (151, 153) back to rated speed (154). The invention provides an engine reference speed which results in minimum fuel consumption during cruise flight.

10 Claims, 8 Drawing Figures

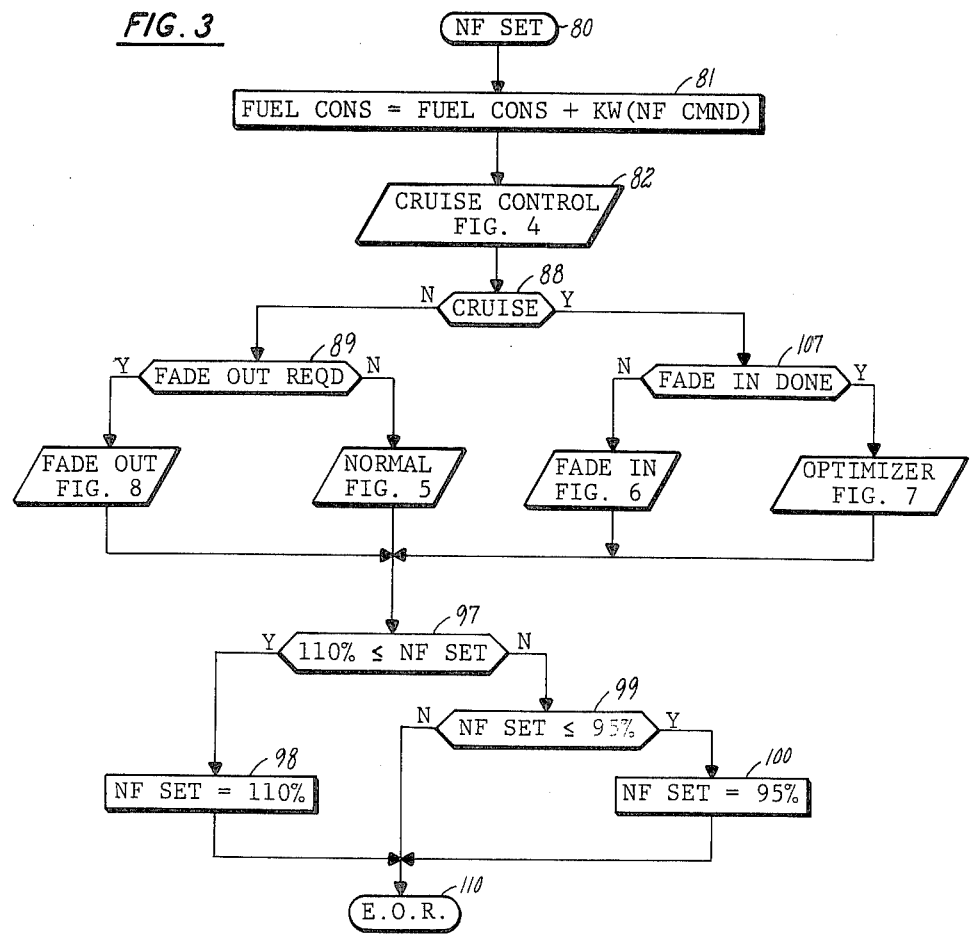
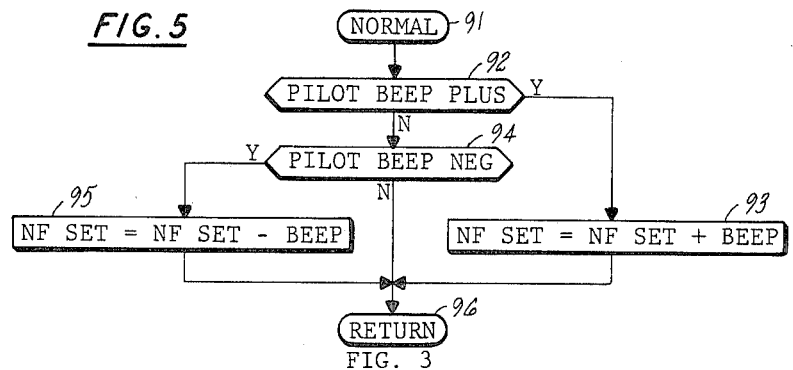

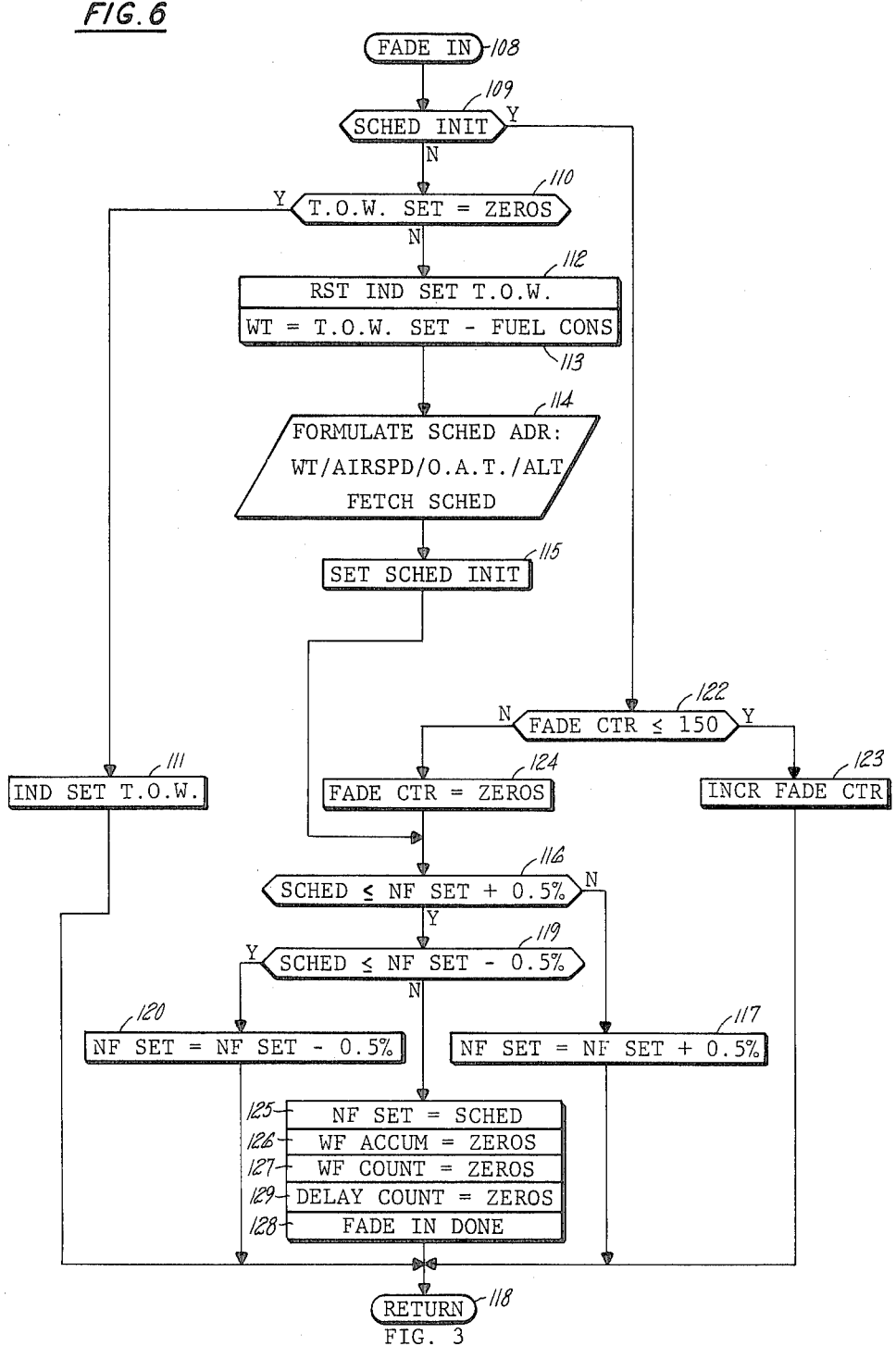

HELICOPTER CRUISE FUEL CONSERVING ENGINE CONTROL

The Government has rights in this invention pursuant to Contract No. DAAK51-80-C-0038 awarded by the Department of the Army.

DESCRIPTION

1. Technical Field

This invention relates to helicopter engine controls, and nore particularly to a helicopter engine control which provides for minimum fuel consumption during cruise mode.

2. Background Art

The flight performance of a helicopter is very highly dependent among other things upon the speed and torque provided to the main rotor, and thus the thrust provided by the main rotor. Nonmally, the helicopter rotor is driven at some fixed rated speed, and variations in the thrust imparted thereby and therefore torque imparted thereto are caused by variations in the rotor blade pitch angles, including collective pitch for speed and lift and cyclic pitch variations for longitudinal and lateral attitude control. In fact, the fuel control for a typical helicopter free turbine gas engine modulates fuel to the engine in a fashion to maintain the free turbine speed equal to rated rotor speed, except to the extent that the pilot may nudge the free turbine speed set point (NF SET) upward or downward a small amount with a beeper. During maneuvers of any kind, the optimum rotor speed for minimum fuel flow will vary constantly due to the constant variations in rotor power requirements. Thus it is easily understood that any attempt to minimize fuel consumption in a helicopter would be futile other than when the helicopter is cruising in steady flight.

When cruising in steady flight, the torque requirements vary with aircraft weight and speed, which establish such factors as induced drag coefficients which correspond with the high angle of attack required for lower rotor speeds, which must be traded off against increase in drag coefficient which results from the advancing blades penetrating deeply beyond the critical Mach number at higher rotor speeds. Thus, the minimum power (and therefore fuel) operating point is a trade-off between blade angle of attack and rotor RPM. For lighter gross weight, slower airspeed and higher air density (lower altitude and/or cooler outside air temperature), the rotor blades are capable of operating at lower angles of attack per rotor speed. Thus, drag coefficients are low and the sensitivity of rotor RPM on power requirements is less than it is when the aircraft is heavily loaded, flying at higher speed, or the air density is less (higher temperature and/or higher altitude).

Initial consideration of these factors may indicate that fuel consumption is simply not worth the effort in a helicopter. However, the attainment of zero percent to 10% fuel savings over significant periods (in excess of 15 minutes at a time) of operating in the cruise mode in relatively stable flight could be very significant.

DISCLOSURE OF INVENTION

Objects of the invention include provision of a helicopter engine control which utilizes minimum fuel when the helicopter is operating in a cruise mode.

According to the present invention, a helicopter engine control provides an optimum rotor speed setting as the reference speed of the rotor driving free turbine which is utilized to determine the amount of fuel to be metered to the engine. According to one aspect of the invention, the optimum speed is determined by an adaptive control which perturbs the reference speed setting by a small increment and compares the fuel flow rate required to maintain the perturbed setting with a fuel flow rate determined prior to perturbing the turbine reference speed; the fuel flow rate is determined by averaging a very large sample of values of fuel commanded to the fuel metering valve. According to another aspect of the invention, a desired miminum fuel reference speed is established by means of a schedule which is determined in accordance with aircraft total weight, outside air temperature, altitude and airspeed. In still further accord with the present invention, transfer between controlling the engine with respect to a normal (rated) reference speed or an estimated optimal reference speed accomplished by fade-in and fade-out routines to avoid perturbing the operation of the engine by any significant amount.

The present invention is easily implemented in a digital fuel control by means of relatively simple program steps; the invention may also be implemented by means of discrete hardware, if desired, utilizing only apparatus and techniques which are readily available and well known in the art, in the light of the teachings which follow hereinafter.

The invention provides on the order of 10% fuel savings in helicopters operating in a cruise mode without deteriorating the performance required during maneuvers.

The foregoing and other objects, features and advantages of the present invention will become more apparent in the light of the following detailed description of exemplary embodiments thereof, as illustrated in the accompanying drawings.

BRIEF DESCRIPTION OF DRAWINGS

FIG. 3 is a logic flow diagram of a computer program for implementing the present invention;

FIG. 5 is a logic flow diagram of a subroutine for setting a reference speed in a normal manner within the program of FIG. 3;

FIG. 6 is a logic flow diagram of a cruise mode fade-in function which establishes a scheduled, minimum fuel speed, for use in the program of FIG. 3;

BEST MODE FOR CARRYING OUT THE INVENTION

Figure 2:
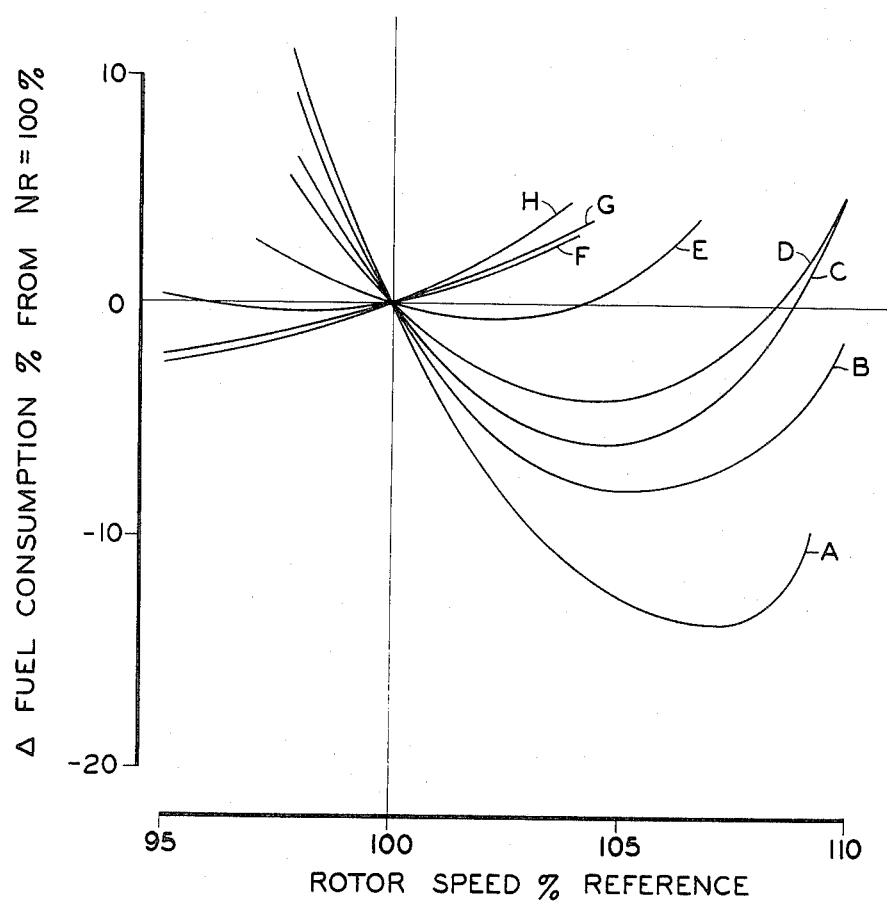
FIG. 2 is a chart illustrative of variations in fuel consumption from that required at a 100% rated speed for a particular helicopter operating at other speeds under various conditions.

Referring first to FIG. 2, for any given combination of aircraft and engine, the fuel flow required varies considerably with flight conditions. Specifically, total aircraft weight, airspeed and air density (including temperature and altitude) are significant.

Fuel flow requirements are established for any given helicopter in various operating conditions by integrating (combining) the power required by the main rotor, tail rotor and accessories at any given rotor drive speed, with engine characteristics at the corresponding rotor drive speed and the same power for the same operating conditions. Such data can be derived from analytical models or from actual test results. Analytically, sophisticated mathematical simulation models of the helicopter system, such as those represented in NASA TM 78629 or Sikorsky Aircraft Report SER 70452 may be used to derive the data. Alternatively, the necessary data can be imperically determined from flight testing a given aircraft. The aircraft can be flight tested throughout the flight envelope and fuel flow is actually measured to establish a fuel requinments data bank. Or, during flights throughout the flight envelope, power requirements can be recorded which are then integrated with the data of any given engine type to be used on the aircraft in order to establish curves similar to those of FIG. 2. The minimum points for various combinations of forward speed, gross weight, altitude and temperature are then determined from the curves, and these minimum points are entered into a schedule, which in the present invention is a stored matrix of desired rotor speed for minimum fuel flow, the particular values of which are accessed using the four controlling parameters in combination as a table lookup address of specific speeds, or based speeds plus interpolation factors.

FIG. 2 illustrates that fuel savings (for the given aircraft represented in FIG. 2) may be a great as 12% (compared to the fuel required at rated speed) for a heavy helicopter flying at high speed and altitude over the desert, as shown by curve A. On the other hand, when the aircraft has lower gross weight and is flying at sea level on a cooler day, the fuel consumption is essentially minimal at or near rated speed, so little savings can be effected as indicated by curve E in FIG. 2.

In FIG. 2, the various curves relate to operating conditions set forth in the following table:

| | CONDITIONS OF FIG. 2 | | | |
|---|---|---|---|---|
| CURVE | WEIGHT (lbs) | SPEED (Knots) | ALTITUDE (Ft.) | AIR TEMP (°F.) |
| A | 10,000 | 130 | 5,000 | 80 |
| B | 10,000 | 130 | 5,000 | 40 |
| C | 10,000 | 130 | Sea Level | 80 |
| D | 8,000 | 130 | 5,000 | 80 |
| E | 8,000 | 130 | 5,000 | 40 |
| F | 8,000 | 130 | Sea Level | 40 |
| G | 8,000 | 80 | 5,000 | 40 |
| H | 8,000 | 80 | Sea Level | 40 |

Below rated speed, conditions A through E yield poor efficiency due to increased angle of attack of the retreating blades, which increases the drag coefficient thereof. These same conditions suffer at speeds somewhat exceeding rated speed (above minimum fuel consumption speed) because of increasing blade tip Mach number on the advancing blade, due to the higher rotor speed. Thus, the balance between speed and blade angle must be found, depending on the current conditions, if minimum fuel consumption is to be achieved.

Figure 1:
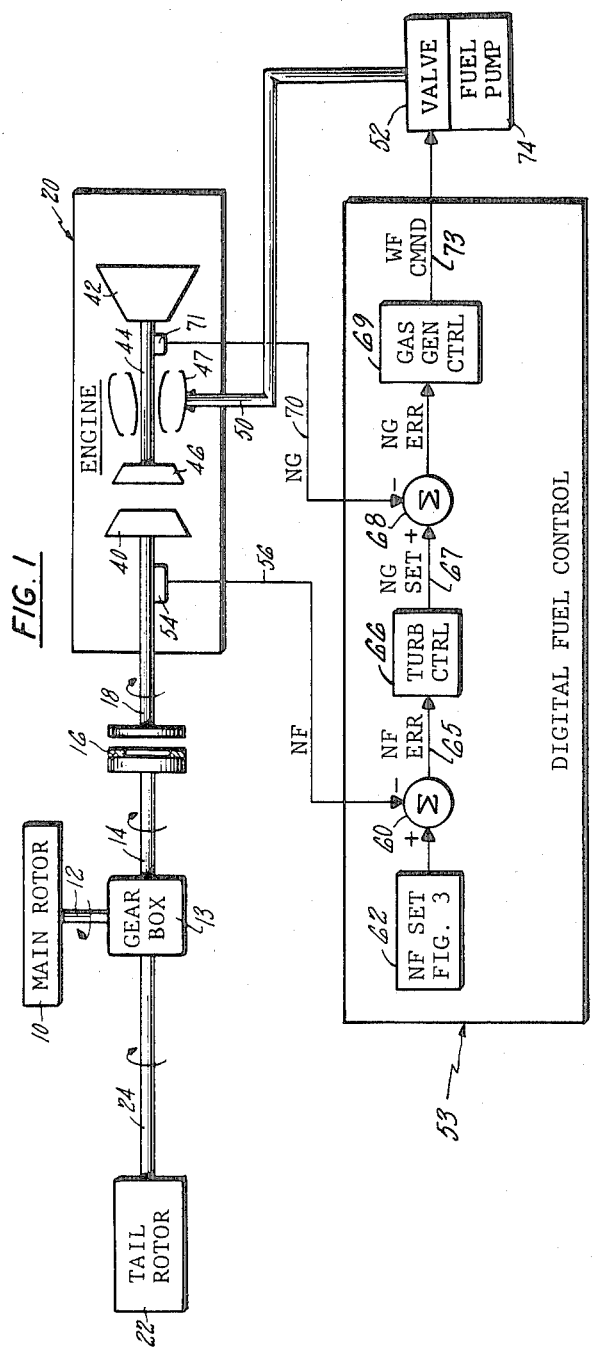
FIG. 1 is a simplified schematic block diagram of a helicopter rotor driving system including a free turbine gas engine and a digital fuel control employing the present invention.

Referring now to FIG. 1, a main rotor 10 is connected through a shaft 12 to a gear box 13 which is driven by a shaft 14 through an overrunning clutch 16, which engages an output shaft 18 of an engine 20 when the engine speed equals or exceeds the rotor speed. The gear box 13 also drives a tail rotor 22 through a shaft 24 so that the main rotor 10 and the tail rotor 22 are always driven at speeds bearing a fixed relationship to each other, such as the tail rotor rotating about five times faster than the main rotor.

The engine 20 may typically comprise a free turbine gas engine in which the output shaft 18 is driven by a free turbine 40, which is in turn driven by gases from a gas generator including a turbocompressor having a compressor 42 connected by a shaft 44 to a compressor-driving turbine 46, and a burner section 47 to which fuel is supplied by fuel lines 50 from a fuel control metering valve 52. A fuel control 53 typically tries to provide the correct rate of fuel (WF) in the fuel inlet lines 50 so as to maintain a desired engine speed (NF) as determined by a tachometer 54 which measures the speed of the free turbine 40 (such as on the output shaft 18) to provide a turbine speed indicating signal on a line 56 to a summing junction 60 (or equivalent function). The other inputs to the summing junction 60 comprise the reference speed (NF SET), which typically is a reference value indicative of 100% rated speed derived from a source 62 together with any pilot-desired variant therein as determined by a signal from the pilot's engine speed beeper. The output of the summing junction 60 is a speed error signal (NF ERR) on a line 65 which is applied to a turbine control (or governor) portion 66 of the fuel control, the output of which is a required gas generator speed signal (NG SET) on a line 67, which is fed to a summing junction 68 at the input of a gas generator control portion 69 of the fuel control. The summing junction 68 is also responsive to a signal indicative of gas generator speed (NG) on a line 70 which may be taken from a tachometer 71 responsive to the gas generator spool including the compressor 42, the shaft 44 and the turbine 46. The gas generator control 69 provides a commanded fuel rate (WF CMND) on a line 73 which is applied to the metering valve 52 so as to cause the correct amount of fuel from a fuel pump 74 to be supplied to the fuel inlet lines 50, as a function of the difference between the required and actual gas generator speed indications, in a well known fashion.

According to the invention, the engine reference speed (NF SET) may be provided in the usual fashion (100% reference plus or minus pilot beeping), or, faded into a cruise mode in which minimum fuel consumption is attained. The invention is described as it may be implemented in a digital fuel control, an NF SET program for which is described with respect to FIG. 3. The NF SET program is entered in FIG. 3 through an entry point 80. In order to keep track of the weight of fuel on board the aircraft, (for purposes described hereinafter) the weight of fuel which has been consumed is continuously monitored by calculating it in every computer cycle in a step 81, in which fuel consumed has added to it some constant times the currently sampled value of the fuel command (NF CMND). The constant (KW) is selected to take into account the cyclic period of the computer and the weight of fuel per command. Thus, the step 81 integrates the fuel commands to show the weight of fuel consumed.

Figure 4:
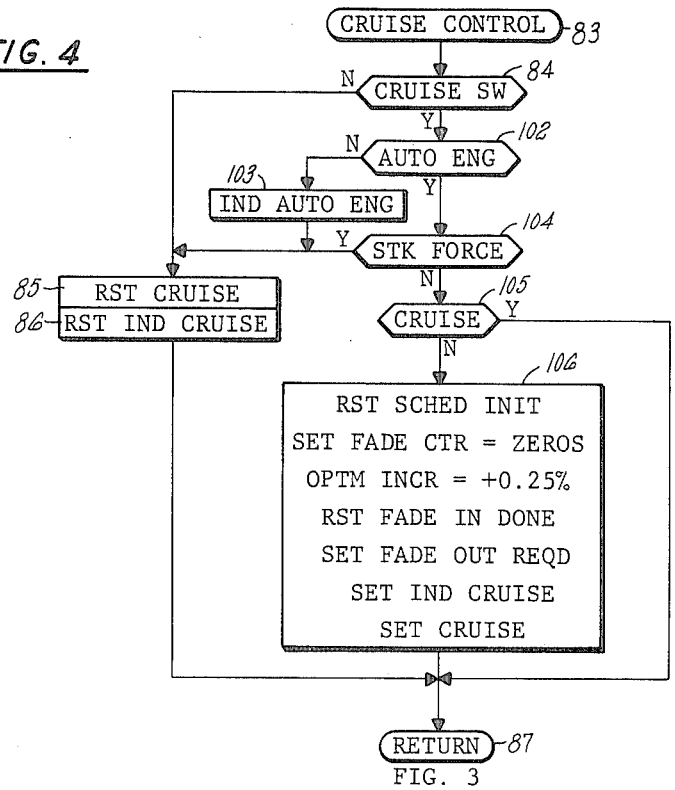
FIG. 4 is a logic flow diagram of a cruise mode controlling subroutine for use in the program of FIG. 3.

In each cycle, a cruise control subroutine, illustrated in FIG. 4 is performed to determine if the cruise mode of the present invention should be initiated, or terminated if already in progress. Referring to FIG. 4, the cruise control subroutine is reached through an entry point 83 and a first test 84 determines whether the pilot has activated a cruise mode switch or not. If not, a negative result of test 84 reaches a step 85 which resets a cruise indicating flag and a step 86 which resets a cruise mode indication to the pilot. And then the NF SET program of FIG. 3 is reached through a return point 87. In FIG. 3, after performing the cruise control subroutine 82, a next test 88 determines if the cruise mode has been set or not. If not, a test 89 determines if fade-out is required. In the general case, other than when the cruise mode has just been terminated, there will not be a fade-out request outstanding so that a negative result of test 89 will reach a subroutine which provides the engine reference speed in a normal fashion, as is illustrated in FIG. 5.

In FIG. 5, the normal subroutine is reached through an entry point 91 and a first test 92 determines if the pilot has made a positive beep to increase the engine reference speed. If so, the engine reference value NF SET is incremented by a beeper increment in a step 93, but if not, a negative result of test 92 reaches a test 94 which determines if the pilot has requested a decrease in engine reference speed by means of his beeper. If so, the reference speed is decremented by the beeper increment in a step 95. If the pilot has required no beeping, the reference speed is left set as it was originally. It is assumed, as is common in any digital fuel control, that upon initial powering up, suitable initialization routines are employed, one of which will cause NF SET to be set to 100% of rated engine speed. When beeping has been accommodated, or NF SET has been left alone, the NF SET program of FIG. 3 is returned to through a return point 96.

In FIG. 3, once NF SET has been established, such as by the normal program of FIG. 5, the reference speed is tested against limits so as not to allow overspeed or underspeed. Overspeed and underspeed can result in excessive vibrations and underspeed can cause the loss of necessary maneuvering control capability. Thus, a test 97 determines if the reference speed is greater than 110% of rated speed. If it is, a step 98 sets the referene speed to 110% of rated speed. But if not, a negative result of test 97 reaches a test 99 to determine if the reference speed is below 95% of rated speed. If it is, the reference speed is set equal to 95% of rated speed in a step 100. If not, NF SET is not altered. When the limiting (if any) has been accomplished, the NF SET routine of FIG. 3 is ended through an end of return point 101, and the computer reverts to performing other tasks.

Referring again to FIG. 4, assume that the pilot has indicated a desire to operate in the cruise mode. The test 84 will be affirmative reaching a test 102 which determines whether the automatic flight control system of the aircraft is engaged or not. If not, a negative result of test 102 will reach a step 103 which causes an indicator to be lit to inform the pilot that he should engage his autopilot before he can enter the cruise mode (although, the invention could be used with the pilot controlling the helicopter trim manually). In that case, redundant resetting of the cruise and indicator cruise flags in steps 85 and 86 are accomplished and the NF SET program of FIG. 3 is reverted to at test 88 and normal reference speed setting will be accomplished through the subroutine of FIG. 5 as described hereinbefore.

In FIG. 4, if the autopilot is engaged, an affirmative result of test 102 will reach a test 104 which determines whether the pilot is applying stick force against the trim established by the automatic flight control system. If he is, the resulting raneuvers render it impossible to maintain a desired cruise minimum fuel flow rate, so that the cruise mode (if it had been engaged) will become disengaged by an affirmative result of test 104 reaching the steps 85 and 86 as described hereinbefore. In the normal case, once the pilot desires the cruise mode, passage through the subroutine of FIG. 4 will be in response to a negative result of the test 104 which reaches a test 105 to determine if the cruise mode flag has been set or not. If not, a series of steps 106 provide initialization for the cruise mode by resetting a schedule initiated flag (utilized in the fade-in subroutine of FIG. 6), resetting a fade counter (utilized in the fade-in subroutine of FIG. 6 and in the fade-out subroutine of FIG. 8), resetting a fade-in done flag and setting a fade-out required flag (both utilized in the NF SET program of FIG. 3), and setting the cruise flag (a pilot indication that the cruise mode has been entered). Then the NF SET program of FIG. 3 is returned to through the return point 87.

In subsequent passes through the cruise control subroutine of FIG. 4, an affirmative result of test 105 will bypass the initialization steps 106. Thus, in the general case, the cruise control subroutine of FIG. 4 is passed through in each machine cycle to determine if cruise should be entered or terminated, so as to determine the correct mode of setting the turbine reference speed.

In the NF SET program of FIG. 3, once the cruise mode has been set, the test 88 will be affirmative reaching a test 107 which determines if fade-in is done or not. Initially, fade-in is not done as indicated by the flag set in step 106 in FIG. 4. Thus, a negative result of test 107 will reach the fade-in program of FIG. 6, through an entry point 108.

The purpose of the fade-in program of FIG. 6 is to bring the reference speed (NF SET) to that speed at which the aircraft flight data indicates minimum fuel flow. For instance, if the aircraft has a 10,000 lbs. gross weight, is flying at 130 knots, at 5,000 feet, with an air temperature of 80°, the desired rotor speed would be about 107% of rated rotor speed, as shown in FIG. 2, curve A. This would supply on the order of 12% fuel saving. But, if control were transferred from the 100% reference established in the normal routine of FIG. 5 (and the initialization at the time the aircraft was started up), this would require a 7% jump in rotor speed which would cause an excessive perturbation in the engine and thoroughly upset the aircraft trim and therefore the aircraft automatic flight control system. Therefore, the speed is brought up slowly by adjusting the reference speed (NF SET) a little at a time until it is close to the desired, minimum fuel consumption speed of FIG. 2.

In FIG. 6, a first test 109 determines whether the schedule has been initiated or not. If not, then a second test 110 determines if the pilot's total on-board weight setting is all zeros or not. If it is, this indicates that the pilot has not entered total on-board weight (indicative of the initial amount of fuel loaded on the aircraft, the cargo, or number of passengers and the like). If the total on-board weight set is all zeros, an affirmative result of test 110 will reach a step 111 to provide a pilot indication that he should set the total on-board weight. No other function is performed by the routine of FIG. 6. If in fact the pilot must react to the indication and set total on-board weight, there may be many machine cycles during which the NF SET routine of FIG. 3 will pass quickly through the test 107 and the fade-in subroutine of FIG. 6 without altering NF SET. This is no problem, since it simply retains the constant speed reference which the aircraft had been previously flying to. Eventually, total on-board weight will become set so that in some subsequent pass of the subroutine if FIG. 6, test 110 will be negative reaching a step 112 which resets the pilot indication to set total on-board weight and a step 113 wherein a weight factor is set equal to total on-board weight set, minus the fuel consumed, which value is established in step 81 of the NF SET program in FIG. 3. Notice that the program of FIG. 3 must be passed through in every machine cycle while the aircraft is in flight, and therefore the fuel consumed value of step 81 will reflect all of the fuel consumed since the aircraft was started. This leaves the present actual weight for use in formulating an address and fetching a desired reference speed from the schedule indicative of the desired speed for minimum fuel flow (as illustrated in FIG. 2). This is achieved by a subroutine 114 of a normal type which simply formulates an address utilizing weight, airspeed, outside air temperature (O.A.T.) and altitude as the components of the address. The formatting of the schedule address can be done in any way suitable for the computer involved, within the skill of the art. If interpolation is used, a typical, known subroutine may be provided. Once the schedule is fetched, a step 115 sets the schedule initiated flag so that subsequent passes through the subroutine of FIG. 6 will yield an affirmative result from test 109, thereby bypassing the weight and schedule fetching functions.

The fade-in process itself begins with a test 116 which determines if the schedule is more than ½% higher than the current NF SET value. If it is, the test 116 will be negative reaching a step 117 which increments NF SET by ½%. And then the NF SET program of FIG. 3 is returned to through a point 118. On the other hand, if the schedule is not more than ½% above NF SET, an affirmative result of test 116 will reach a test 119 to determine if the schedule is more than ½% below the current reference speed. If it is, an affirmative result of test 119 reaches a step 120 which decrements NF SET by ½%. Then the NF SET program of FIG. 3 is returned to through a point 118. In FIG. 3, the reference speed is checked against limits by the steps and tests 97-100, as is true in all cases. In the next pass through the NF SET program of FIG. 3, assuming that the desired, minimum fuel airspeed is significantly different from the original reference speed when cruise was initiated, the fade-in will not be completed so that test 107 will again be negative. In FIG. 6, test 109 is affirmative so that a test 122 is reached which determines if a fade counter is still set to less than 150. Since this counter is reset during cruise initiation (one of the steps 106 in the subroutine of FIG. 4), the initial test of the fade counter will always be affinmative. This causes a step 123 to increment the fade counter and the program of FIG. 3 is returned to through the point 118. In a usual case, the schedule may be a percent or more away from the initial reference speed, so that the routine of FIG. 6 will pass through an affirmative result of test 122 and step 123 many times without any effect on the reference speed (beyond that in the first pass after schedule initiation as indicated in steps 117 and 120 hereinbefore). Ultimately, the fade counter will have been incremented to exceed 150 counts so that test 122 will be negative. A count of 150 will provide the opportunity to change the reference speed in either step 117 or step 120, once every half minute, assuming a basic computer cycle time of 200 milliseconds. This provides a maximum desirable step function change in the set speed of about ½%, and an overall speed variation on the order of 5% across 10 minutes, which is acceptable. The negative result of test 122 causes a step 124 to reset the fade counter to all zeros (thus initiating the next fade-in counting period). Then the test 116 and step 117 or test 119 and step 120 will be reached so that the reference speed will be incremented or decremented (as appropriate) by ½%, bringing it ½% closer to the desired minimum fuel speed indicated by the schedule. This will continue until the reference speed has been incremented to within ½% of the schedule. It may in fact have been incremented upwardly to a slight percentage in excess of the schedule, or decremented downwardly to a slight fraction of a percentage below the schedule. But in either case, ultimately the test 116 will be affirmative and the test 119 will be negative indicating that the reference speed is within ½% of the schedule. A negative result of test 119 will cause a step 125 to set the reference speed to be equal to the speed indicated by the schedule, steps 126, 127 and 129 reset the weight of fuel accumulator and counter and the delay counter (for purposes described hereinafter with respect to FIG. 7) and a step 128 sets the fade-in done flag. The NF SET program of FIG. 3 is returned to through the point 118 and the final faded in value of the scheduled reference speed is checked against outside limits by the tests and steps 97-100 (as is true for every speed reference which is set).

Figure 7:
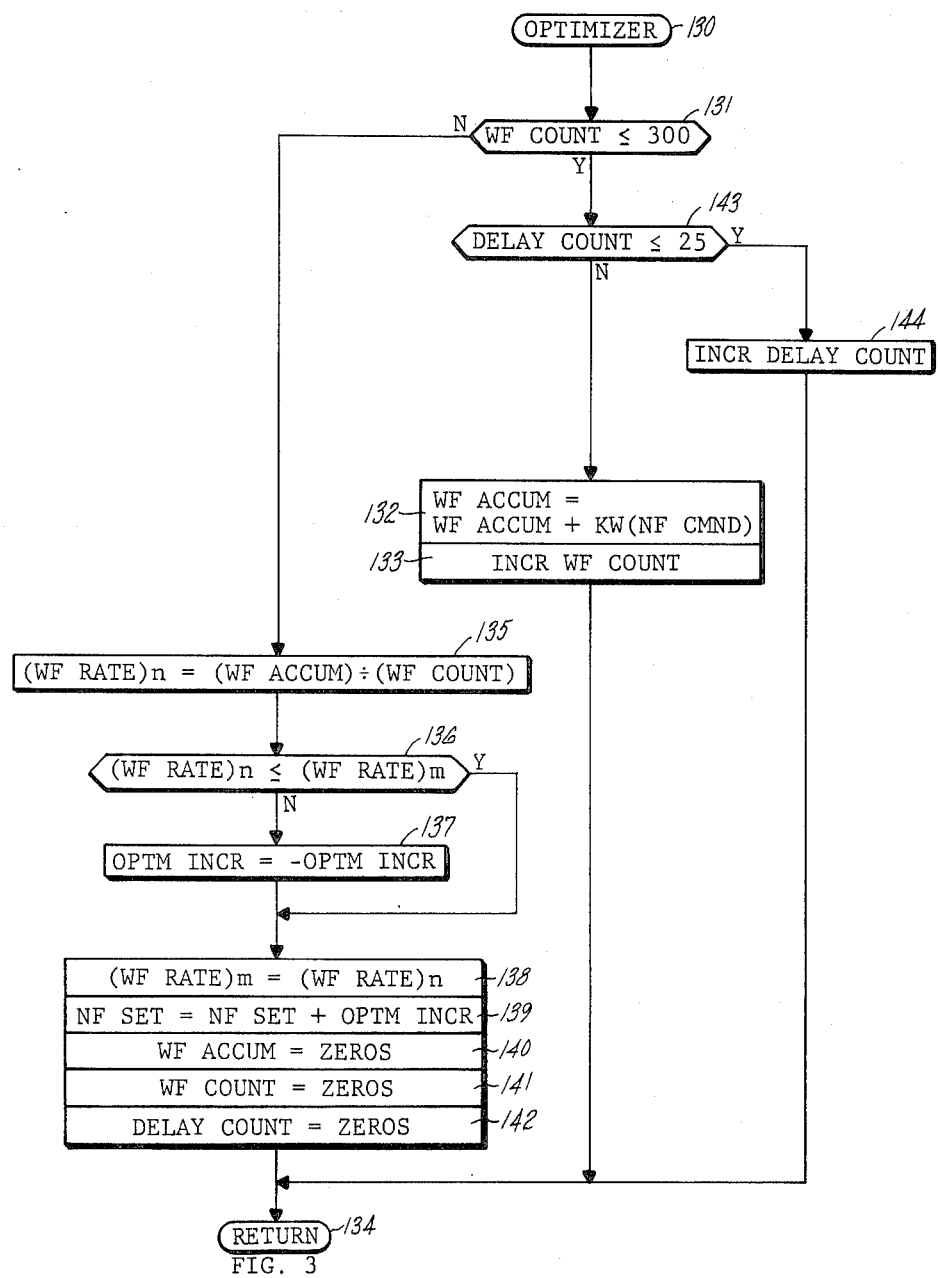
FIG. 7 is a logic flow diagram of an optimizer function for determining the desired rotor speed for minimum fuel consumption, for use in the program of FIG. 3.

As soon as fade-in is completed, the next pass through the NF SET program of FIG. 3 will find an affirmative result of test 107 thereby reaching the optimizer subroutine of FIG. 7, which provides optimization in accordance with the present invention. In FIG. 7, the optimizer subroutine is reached through an entry point and a first test 131 determines if a weight of fuel count has reached 300 or not. According to the present invention, a large number of samples of commanded fuel (WF CMND) are sampled because there is a significant amount of noise on the fuel command (incremental changes therein which are not indicative of engine/aircraft operation). Additionally, the invention takes into account the need for allowing settling at any given level of fuel rate. For instance, the turbine reference speed is compared with the turbine speed, and if there is error, this is reflected in the gas generator speed command (NF CMND) which in turn results in an increment of fuel flow. This in turn alters the torque being generated by the gas generator and imparted by the free turbine to the rotor. If the rotor changes speed, the automatic flight control system must then adjust the various blade pitch angles to retain trim, altitude and speed. Once this is accomplished, the turbine speed may again adjust (such as in the obvious case of the blade angle of the main rotor being increased by the speed/altitude hold system, the rotor will require more torque, slowing down the turbine, creating a larger error and requiring readjustment). Therefore, utilizing a relatively high count taken over a sampling period of on the order of a minute (although it may be slightly more or less to suit any given implementation) accommodates the acquisition of relatively valid fuel data which eliminates noise considerations. And, providing a settling delay period, of on the order of 5 seconds or so, allows reestablishment of desired flight conditions as a result of any perturbation in the reference speed set point. Since the weight of fuel count is initialized to zero in step 127 of FIG. 6, the first pass through the optimizer subroutine of FIG. 7 will always find an affirmative result of test 131. This reaches a test 143 which determines if a settling delay period is complete; since the delay count is initialized to zeros in steps 106 of FIG. 4, the delay count is always zero in the first pass through the optimizer subroutine of FIG. 6. An affirmative result of test 143 reaches a step 144 which increments the delay counter, and the NF SET program of FIG. 3 is returned to through a point 134. Once optimizing begins, there will be no change in the set point for about a whole minute at a time, repetitively, thereafter. After passing through the subroutine of FIG. 7 twenty five times (about 5 seconds in a 200 ms machine), test 143 will be negative. This indicates that a sufficient settling time has occurred since the last change in the NF SET value; in the initial iteration, this is 5 seconds after establishing the estimated optimum speed of the schedule; in subsequent passes, this is 5 seconds after the most recent perturbation of NF SET. This reaches a step 132 which adds an increment of fuel command to a weight of fuel accumulator (which is initially set at zero by step 126 in FIG. 6). Then, a step 133 increments the weight of fuel counter and the NF SET program of FIG. 3 is returned to through a point 134. At the end of about a minute, the test 131 will eventually be negative reaching a step 135 which provides a current factor of fuel consumption rate, (WF RATE)n which equals the accumulated fuel command weight (as described hereinbefore with respect to step 81 in FIG. 3, but as performed during the count period only, in step 132 of FIG. 7) by the number of fuel weight increments included in the accumulation as indicated by the weight of fuel count which is incremented in step 133 of FIG. 7. This gives a fairly accurate representation of the fuel rate across the count period. However, since the count is the same in iteration after iteration, the division of step 135 can be eliminated if desired, and the accumulation of one cycle could be compared with that of another cycle in the same way that the rate is compared as described hereinafter. Alternatively, depending upon the constancy of cycle time and other factors, a real time clock could be utilized to accumulate fuel commands over a given time period, in one iteration after the other, if desired.

The fuel consumption rate determined in this iteration is compared in a test 136 with the fuel consumption rate determined in a prior iteration, (WF RATE)n. If the fuel rate were less in this iteration than it was in the prior iteration, this means that the optimizer is working in the right direction so that the sign of an optimum increment of reference speed is also correct. On the other hand, if the current iteration used more fuel than the prior iteration, this means that the optimizer is working in the wrong direction. In such a case, a negative result of test 136 will cause a step 137 to reverse the sign of the optimum increment. Then, a step 138 causes the last iteration fuel rate to be updated to this iteration fuel rate for use in the subsequent iteration. A step 139 adds the optimum increment to the current reference speed and steps 140–142 zero the weight of fuel accumulator and counter and delay counter for use in the next iteration. Then, through step 134, the NF SET program of FIG. 3 is reverted to and the newly incremented speed reference is checked against limits by tests and steps 97–100, as usual. During the next following 325 cycles, the settling period is counted in step 144 and then the fuel increments are accumulated in step 132 and the count is incremented in step 133, after which the fuel rate of that iteration is compared to the fuel rate of the prior iteration, to determine if the sign of the optimum increment should be changed in step 137, and the increment (with or without a change in sign) is added to the previous reference value, NF SET. In this fashion, during the optimizer operation of the present invention, the turbine reference speed is perturbed by $\frac{1}{4}$% (or such other increment as is desired) of rated speed once about every minute (or such other suitable time as is established) and the fuel consumption during that minute is compared with the fuel consumption during the prior minute to see if it has improved or not. If it has improved, the sign of the optimum increment remains the same; otherwise, the sign is changed. Ostencibly, assuming perfectly steady state conditions (which of course is impossible in a helicopter driven by a free turbine gas engine) the sign of the optimum increment would change in each iteration. However, the steps are sufficiently small that there is a nearly imperceptible change in engine and helicopter rotor conditions as a consequence thereof; but enough change to affect fuel rate.

In a normal case, it can be assumed that the pilot will engage the cruise mode only when he expects to be cruising in steady flight conditions for one-quarter of an hour or more. During this time, the optimizer subroutine of FIG. 7 will be controlling the free turbine reference speed as described. However, eventually the aircraft will reach a point where it should begin its descent to terminate the flight, or some other event will terminate the steady flight in cruise. For instance, the pilot may be instructed to alter his flight path as a consequence of heavy traffic conditions, and thereby be required to establish radically new automatic flight control system references. In which case, he may disengage the automatic flight control. Or, the pilot may feel the need to evade a nearby aircraft quickly, by introducing pitch or roll moments through the cyclic pitch stick. In either of these cases, the cruise control subroutine of FIG. 4 will terminate the cruise mode of engine control operation. Thus in FIG. 4, if the pilot simply decides to end the cruise engine control mode, he may turn the cruise mode off in which case test 84 will be negative. Or, if near the end of the flight he disengages the automatic flight control system, then test 102 would be negative. Or, if he applies force on the cyclic stick (and if desired, the test 104 could also be made responsive to collective stick or pedals, though there is little need therefor during cruise), test 104 will be affirmative.

In any of these events, cruise is reset and the indication thereof is reset in the steps 85 and 86. As the NF SET program of FIG. 3 is returned to through the point 87, the test 88 then will be negative reaching the test 89. Since the fade-out required flag is set initially in the steps 106 of FIG. 4 when the cruise mode is entered, this flag will still be on so that test 89 in FIG. 3 will be affirmative. This reaches the fade-out subroutine of FIG. 8.

Figure 8:
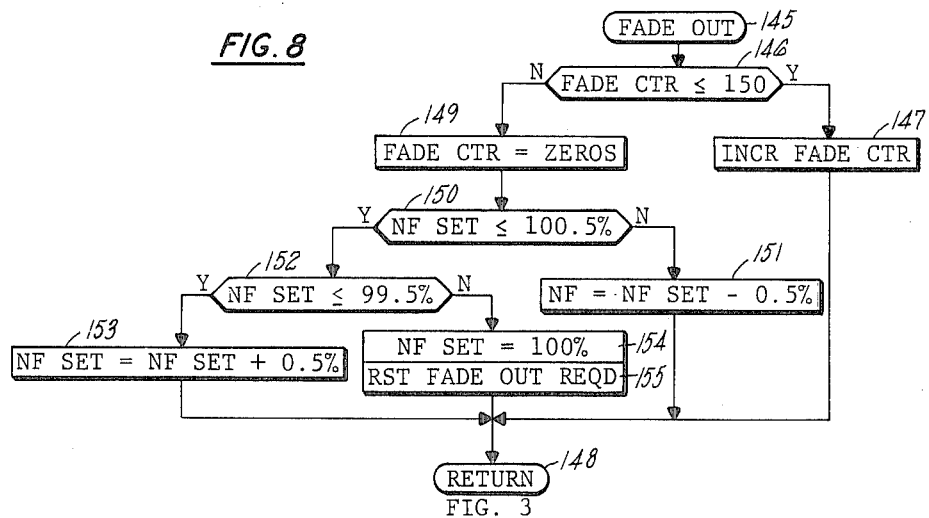
FIG. 8 is a logic flow diagram of a fade-out function for use in the program of FIG. 3.

In FIG. 8, the subroutine is entered through a point 145 and a first test 146 determines if the fade counter has exceeded 150 counts. Since the fade counter is set to all zeros in step 124 of FIG. 6 during the last pass through the fade-in subroutine, the initial passes through the fade-out subroutine will have an affirmative result of test 146. This reaches a step 147 which increments the fade counter and the NF SET program of FIG. 3 is returned to through a point 148, without altering the speed reference. This is permissible, even though the cruise mode was terminated by the pilot inducing a maneuver through stick force, because the torque requirements of the rotor will be met due to the fact that the speed error will be large, thus calling for more fuel and increasing the torque to the free turbine.

The fade-out subroutine of FIG. 8 will be passed through 150 times (approximately one-half minute in a 200 millisecond machine) while the fade counter is incremented. Eventually, test 146 will be negative reaching a step 149 which will set the fade counter to all zeros. And then the reference speed is examined in a test 150 to see if it exceeds 100% reference speed by more than ½%. If it does, a negative result of test 150 will reach a step 151 which decrements the reference speed by ½%. On the other hand, if the reference speed is not greater than ½% in excess of 100% rated speed, an affirmative result of the test 150 will reach a test 151 where the reference speed is examined to see if it is more than ½% below rated speed. If it is, the rated speed is simply incremented by ½% in a step 153. And then the NF SET program of FIG. 3 is returned to through the point 148 and the adjusted reference speed is tested against limits in the tests and steps 97–100 as usual. In the next 150 passes through the NF SET program of FIG. 3, test 89 is affirmative reaching the fade-out subroutine of FIG. 8 in which test 146 is also affirmative so the only activity is incrementing the fade counter in step 147 of FIG. 8. After about one-half minute, the test 146 will again be negative so that the reference point will again be incremented or decremented, if necessary. In some subsequent iteration through FIG. 8, test 146 will be negative, test 150 will be affirmative and test 152 will be negative indicating that the reference speed has been adjusted to within ½% of 100% rated speed. In such case, a negative result of test 152 will reach a step 154 where the reference speed is reestablished as 100% rated speed, and a step 155 will reset the fade-out required flag. The NF SET program of FIG. 3 is returned to through a point 148.

In subsequent passes through the NF SET program of FIG. 3, after fade-out is completed, test 89 will be negative so that the nonmal routine of FIG. 5 will be utilized, holding the reference speed at 100% rated speed unless the pilot beeps the reference speed up or down, as described hereinbefore.

A first and important aspect of the present invention is the signal processing illustrated by the exemplary subroutine in FIG. 7. The signal processing exemplified therein according to this aspect of the invention takes a large number of samples of a signal indicative of fuel consumption rate; the large number of samples is both sufficient to eliminate noise considerations (on a random, average basis), and to provide adequate time for the adjusted reference speed to effect fuel flow rate, turbine torque, and rotor blade angle requirements, with the turbine torque perturbations feeding back through free turbine speed (NF) and providing a speed error in contrast with the newly established reference speed (that established in step 139 of FIG. 7). This aspect of the invention may be used alone, or it may be used along with other aspects of the present invention. A second aspect of the present invention is the establishment of a nominal minimum fuel flow rate reference speed by means of a schedule which takes into account the aircraft total weight, speed, altitude and outside air temperature. In the embodiment of the invention shown herein, the use of a nominal optimum reference speed by means of the schedule is simply the starting point, and it is used in conjunction with the optimizer aspect of the invention because it is difficult to predict the variations in minimum fuel consumption speed from one aircraft to the next of the same type, due to production tolerances, and for a given aircraft over its life span as rotor and engine performance decay somewhat due to use. However, use of the schedule to initialize the operation is advantageous since it permits adjusting the reference speed in one direction only at a rate which is somewhat faster than the rate required by the optimizer to ensure adequate numbers of fuel samples and adequate settling down of the system as a result of perturbing the reference speed during each iteration.

The second aspect of the invention, utilizing a nominal minimum fuel reference speed, may be utilized in a simpler system (one formulated digitally with dedicated hardware, in which optimizing is very difficult, or in an analog system) provided accommodation is made for looking up the desired values in a table. Although it is possible to establish a schedule utilizing analog circuitry, such circuitry would be extremely complex and unreliable due to the variations of circuit parameters over periods of time. Thus the fuel savings reliability as compared to cost and complexity would probably not justify an analog variation of the invention. Also, the second aspect of the invention (a minimum fuel speed schedule) may be used simply to provide beep-up and beep-down indications to the pilot until he beeps the NF SET to approximately the minimum fuel speed of the schedule.

A third aspect of the invention is the utilization of fade-in and fade-out between the cruise mode and nonmal reference speed control. This aspect of the invention would not be required if the optimizer was to be utilized without utilizing the initializing schedule. This is because of the fact that if the desired, minimum fuel consumption speed were to be reached, the sign of the optimum increment would remain the same through many iterations, and thus the desired reference speed would be approached directly from the nominal reference speed established by the normal part of the program. Thus, the optimizer may be used alone, the schedule may be used alone as a pilot beep indication or used together with fade-in or fade-out, or all three may be used together as described in the exemplary embodiment herein, or, the pilot could beep to the schedule and the optimizer used thereafter.

The exemplary embodiment herein is described as being implemented within a program of a digital fuel control 53 (FIG. 1). The particular characteristics of the fuel control are irrelevant, so long as it is of the type that uses a turbine reference speed to control fuel flow to the engine. The manner in which it controls fuel flow is irrelevant to the present invention. Thus, the invention is implementable in any digital fuel control directly, provided such digital fuel control includes a mircroprocessor or other computer. The invention is readily implemented for use with any fuel control (only the NF SET function thereof 62 being altered by the invention). In a dedicated hardware digital fuel control, the invention may be practiced in an automatic flight control system computer, if one is available on board the aircraft. Interfacing between the digital fuel control and the automatic flight control system computer is a simple matter as is known in the art. Additionally, the invention may be practiced in a minute microprocesor devoted only to setting reference speed, or with suitable analog-to-digital conversion to an analog fuel control, or with direct digital interfacing with a digital fuel control of any type. All of the cycle times, counts, and the like herein may of course be adjusted to suit any implementation and utilization of the invention.

The invention, although disclosed as it may be implemented in a system having a computer, may also be implemented in dedicated digital hardware in a manner which is an obvious variant of that described herein. However, it is anticipated that dedicated hardware to perform the functions of the invention would be far more costly than utilization of a suitably programmed microprocessor. All of the foregoing is irrelevant to the invention, it suffice to select the aspects thereof and provide suitable signal processing to achieve the desired result in accordance with the invention, in a manner suited to the intended aircraft use.

Similarly, although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. A control for a helicopter engine having a free turbine for normally driving the helicopter rotors at a rated speed, comprising:

means for providing an actual speed signal indicative of the rotary speed of the free turbine;

a fuel valve means for metering fuel to said engine at a rate determined by a fuel command signal applied thereto; and a fuel controlling signal processing means connected for response to said actual speed signal, for providing a reference speed signal indicative of desired rotary speed of the free turbine, for providing, in response to said actual speed signal and said reference speed signal, a speed error signal indicative of the difference in turbine speed indicated by said actual speed signal and said reference speed signal, and for providing said fuel command signal to said fuel valve means indicative of a desired fuel flow rate as a function of said speed error signal;

wherein the improvement comprises:

said signal processing means comprising means responsive to said fuel command signal for, iteratively, in a sequence of successive iteration periods of time, summing a large number of samples of the fuel flow rate commanded to said valve means over a commensurate sampling period of time, the sampling period in each iteration period being separated from the sampling period of the next subsequent iteration period by a settling period of an order of magnitude approximating the time period required for the helicopter response to a small change in engine speed to be substantially settled, said number of samples being of an order of magnitude to substantially eliminate the effects of noise in said samples on said summation, for providing a current fuel rate signal indicative of said summation, for providing, near the end of each of said iteration periods, a previous fuel rate signal equal to said current fuel rate signal after comparing the current fuel rate signal provided in the current sampling period with the previous fuel rate signal provided in the next previous sampling period, for providing a reference speed increment signal indicative of a small fraction of the turbine reference speed, said increment signal having a sign indicative of either an increase or a decrease in turbine speed and a magnitude small enough so that perturbations in engine speed will not unduly perturb the engine or the helicopter and large enough so that the change in reference will cause a change in fuel flow provided to the engine under helicopter flight conditions in which the engine fuel requirements indicated by said summation signal can vary as a function of turbine speed, for changing the sign of the increment signal in any of said iteration periods in which the current fuel rate signal exceeds the previous fuel rate signal provided in the next previous sampling period, and for providing, in each iteration period, said reference speed signal as the summation of said reference speed signal with said increment signal so that the reference speed signal is incremented, in successive iteration periods, in the same sense so long as said summation signal decreases but is incremented in a reverse sense in the event that said summation signal increases.

2. A control according to claim 1 wherein said signal processing means comprises means for providing said reference speed increment signal indicative of a significant fraction of one percent of the turbine rated speed.

3. A control according to claim 1 wherein said signal processing means comprises means for providing said summation signal in response to on the order of 300 samples in each of said sampling periods.

4. A control according to claim 1 wherein by said signal processing means comprises means for providing said summation signal in response to samples of the fuel flow rate commanded to said valve means over a sampling period of time on the order of one minute.

5. A control according to claim 1 wherein by said signal processing means comprises means for providing a maximum limit speed signal and a minimum speed limit signal respectively indicative of a range of acceptable speeds above and below which operation of the turbine is undesirable with respect to helicopter performance, for comparing the reference speed signal provided in each of said sampling periods to at least one of said limit signals, and for providing said reference equal to one of said limit signals in the event that incrementing in such sampling period results in a reference signal indicative of a speed outside of said range of acceptable speeds.

6. A control for a helicopter engine having a free turbine for normally driving the helicopter rotors at a rated speed, comprising:

means for providing an actual speed signal indicative of the rotary speed of the free turbine;

a fuel valve means for metering fuel to said engine at a rate determined by a fuel command signal applied thereto; and a fuel controlling signal processing means connected for response to said actual speed signal, for providing a reference speed signal indicative of desired rotary speed of the free turbine, for providing, in response to said actual speed signal and said reference speed signal, a speed error signal indicative of the difference in turbine speed indicated by said actual speed signal and said reference speed signal, for providing said fuel command signal to said fuel valve means indicative of a desired fuel flow rate as a function of said speed error signal;

wherein the improvement comprises:

said signal processing means comprising means for registering a plurality of flight parameter signals, including an altitude signal indicative of current altitude of the helicopter, a temperature signal indicative of the current temperature of the environment outside of the helicopter, an airspeed signal indicative of the current airspeed of the helicopter, and a weight signal indicative of the current total weight of the helicopter, for providing, in response to all of said flight parameter signals, an optimum speed signal indicative of an estimated optimum free turbine speed for minimum engine fuel requirement for helicopter flight conditions indicated by said flight parameter signals, and for providing a manifestation of whether said speed reference signal indicates a speed which is respectively higher or lower than said estimated optimum free turbine speed.

7. A control according to claim 6 wherein said signal processing means comprises means for providing said reference speed signal in response to said estimated optimum speed signal.

8. A control according to claim 7 wherein said signal processing means comprises means for providing said reference speed signal equal to said estimated optimum speed signal.

9. A control according to claim 6 wherein said signal processing means comprises means for providing said manifestation as a fade-in increment signal having a sign indicative of said speed reference signal indicating a speed higher or lower than said estimated optimum free turbine speed and a magnitude small enough so that changes in said reference speed thereby will not unduly perturb the engine or the helicopter, and for, iteratively, in a succession of fade-in periods, providing said speed reference signal as the summation of the speed reference signal provided in the next previous one of said fade-in periods with said fade-in increment signal in each of said fade-in periods in which said previous reference speed signal differs from said estimated optimum speed signal by more than the magnitude of said increment signal, and, in a final one of said fade-in periods in which said previous reference speed signal does not differ from said estimated optimum speed signal by more than said magnitude, providing said reference speed signal equal to said estimated optimum speed signal.

10. A control according to claim 9 wherein by said signal processing means comprises means for providing a fade-in complete control signal indicative of said reference speed signal being provided equal to said estimated optimum speed signal in said final fade-in period, and thereafter, in response to the presence of said fade-in complete control signal, for iteratively, in successive ones of sequence of sampling periods of time, summing, in response to fuel command signal, a large number of samples of the fuel flow rate commanded to said valve means over a commensurate sampling period of time, and for providing a current fuel rate signal indicative of said summation, for providing near the end of each of said sampling periods, a previous fuel rate signal equal to said current fuel rate signal after comparing the current rate signal provided in the current sampling period with the previous fuel rate signal provided in the next previous sampling period, for providing a reference speed increment signal indicative of a small fraction of the turbine reference speed, said increment signal having a sign indicative of either an increase or a decrease in turbine speed, for changing the sign of said increment signal in any of said sampling periods in which the current fuel rate signal exceeds the previous fuel rate signal provided in the next previous sampling period, and for providing, in each of said sampling periods, said reference speed signal as the summation of said reference speed signal with said increment signal so that the reference speed signal is incremented, in successive sampling periods, in the same sense so long as said summation signal decreases but is incremented in a reverse sense in response to said summation signal increasing.

* * * * *

UNITED STATES PATENT AND TRADEMARK OFFICE
CERTIFICATE OF CORRECTION

PATENT NO. : 4,488,236

DATED : December 11, 1984

INVENTOR(S) : Terry Morrison, James J. Howlett, Raymond D. Zagranski

It is certified that error appears in the above-identified patent and that said Letters Patent is hereby corrected as shown below: On the title page

[73] Correct Assignee's Name to read -- Chandler Evans, Inc. West Hartford, Conn. --

Col. 1, line 12, "nore" should read -- more --.
Col. 1, line 19, "Nonmally" should read -- Normally --.
Col. 3, line 19, "requinments" should read -- requirements --.
Col. 3, line 34, "a" should read -- as --.
Col. 6, line 2, "raneuvers" should read -- maneuvers --.
Col. 11, line 40, "nonmal" should read -- normal --.
Col. 12, lines 30 & 31, "nonmal" should read -- normal --.
Col. 14, Claim 4, line 28, "by" should be deleted.
Col. 14, Claim 5, line 33, "by" should be deleted.
Col. 16, Claim 10, line 6, "by" should be deleted.

Signed and Sealed this

Fourth Day of June 1985

[SEAL]

Attest:

DONALD J. QUIGG

Attesting Officer

Acting Commissioner of Patents and Trademarks